United States Patent [19]

Hunt

[11] 4,119,872
[45] Oct. 10, 1978

[54] DYNAMO ELECTRIC MACHINE

[75] Inventor: Peter Hunt, Shipley, England

[73] Assignee: Lucas Industries Limited, Birmingham, England

[21] Appl. No.: 670,776

[22] Filed: Mar. 26, 1976

[30] Foreign Application Priority Data

Apr. 5, 1975 [GB] United Kingdom ............... 14046/75

[51] Int. Cl.² .............................................. H02K 1/32
[52] U.S. Cl. ......................................... 310/61; 310/59
[58] Field of Search ....................... 310/54, 58, 59, 60, 310/61, 64, 65, 52, 270; 239/225; 277/3, 25, 27, DIG. 8

[56] References Cited

U.S. PATENT DOCUMENTS

| 3,163,789 | 12/1964 | Rosenberg | 310/64 |
|---|---|---|---|
| 3,480,810 | 11/1969 | Potter | 310/61 |
| 3,497,736 | 2/1970 | Cuny | 310/54 |
| 3,629,627 | 12/1971 | Dafler | 310/54 |
| 3,686,522 | 8/1972 | Konovalon | 310/59 |
| 3,733,502 | 5/1973 | Curtis | 310/61 |
| 3,740,596 | 6/1973 | Curtis | 310/54 |
| 3,742,266 | 6/1973 | Heller | 310/54 |
| 3,821,569 | 6/1974 | Sippol | 310/64 |
| 3,916,230 | 10/1975 | Albaric | 310/61 |
| 3,955,111 | 5/1976 | Weghaupt | 310/64 |

FOREIGN PATENT DOCUMENTS 413,990 12/1966 Switzerland ............... 310/61

Primary Examiner—R. Skudy
Attorney, Agent, or Firm—Ladas, Parry, Von Gehr, Goldsmith & Deschamps

[57] ABSTRACT

A dynamo electric machine wherein a hollow rotor shaft carries cooling oil, there being outlet means in the wall of the hollow shaft whereby the oil is discharged from the shaft onto the windings of the machine to cool the windings. The outlet includes a hollow tubular screw which extends through the rotor shaft wall and which protrudes inwardly from the inner surface of the shaft so as to receive oil from a region of the shaft interior which is spaced radially inwardly of the inner surface of the shaft. The hollow screw discharges oil at the exterior of the shaft into an annular weir member which is carried by and encircles the shaft and from which oil is thrown onto the windings of the machine to cool the windings. The hollow screw in addition to defining the oil outlet from the shaft serves at least in part, to secure the weir member to the shaft.

2 Claims, 1 Drawing Figure

U.S. Patent  Oct. 10, 1978  4,119,872
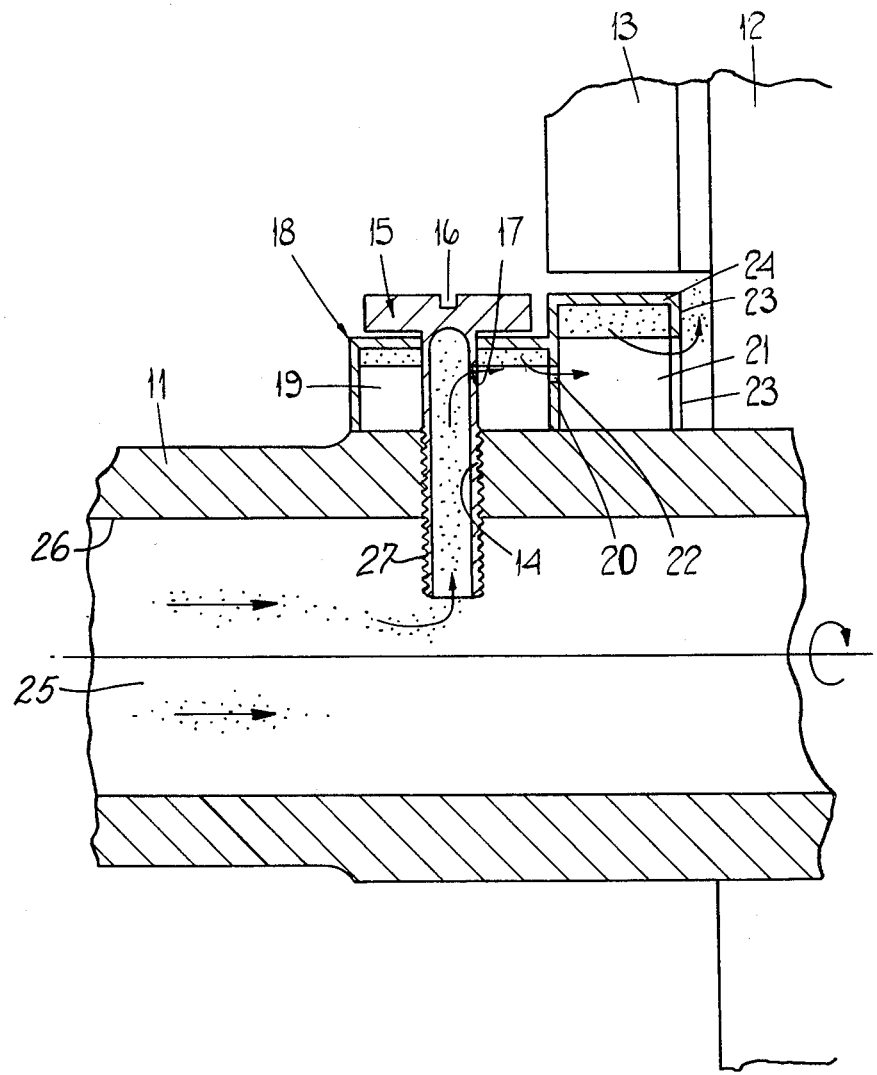

DYNAMO ELECTRIC MACHINE

This invention relates to dynamo electric machines of the kind including a hollow rotor shaft along which cooling oil flows, there being oil outlet means in the wall of the hollow shaft whereby oil is discharged from the shaft onto windings of the machine to cool the windings.

According to the invention in a machine of the kind specified said outlet means includes a tubular element which extends through the rotor shaft wall and which protrudes inwardly from the inner surface of the shaft so as to receive oil from a region of the shaft interior spaced inwardly from the inner surface of the shaft, said element discharging oil at the exterior of the shaft into an annular weir member carried by and encircling the shaft which presents an annular recess to the shaft, oil discharged from said element collecting in use, as a result of centrifugal force, in said recess and when said recess is full, overflowing an edge of said recess around the recess periphery so as to be thrown, by centrifugal force, onto windings of the machine encircling said shaft and disposed generally radially outwardly from said edge of the recess, said element serving at least in part as the means securing said weir member to said shaft.

Preferably said tubular element is a hollow bolt or screw secured to the shaft by being in screw threaded engagement with the wall of a bore in said shaft.

Desirably more than one tubular element is associated with the weir member, the elements being spaced around the shaft and together serving to secure the weir member to the shaft.

The accompanying drawing is a diagrammatic, fragmentary, cross-sectional representation of part of a dynamo electric machine in accordance with one example of the invention.

Referring to the drawings, the machine, which is an alternator, includes a casing (not shown) carrying bearing members supporting a rotor shaft 11 for rotation within the casing. The rotor shaft 11 is hollow, defining a longitudinal passageway 25 which is supplied continuously, while the alternator is operating, with oil at relatively low pressure, by way of an oil cooler. The casing of the alternator carries on its inner surface stator windings of the alternator, and the rotor shaft carries rotor windings in a rotor assembly, the rotor assembly being rotatable within the stator assembly supporting the stator windings.

When the alternator is operating heat is generated in the rotor and stator windings, and this heat must be dissipated if the alternator is to operate efficiently. The oil supplied to the interior of the rotor shaft 11 is utilized to aid cooling of the rotor and stator windings, particularly those portions of the windings which project from their respective assemblies to define the stator and rotor overhangs respectively. The rotor assembly 12 has its windings 13 projecting at both ends of the assembly 12 to define rotor overhangs, and similar overhangs occur on the stator assembly, the stator assembly of course being disposed radially outwardly from the rotor assembly. Adjacent each end of the rotor assembly 12 the wall of the rotor shaft 11 is formed with a plurality of transverse through bores 14. The bores adjacent one end of the rotor assembly 12 are aligned circumferentially of the shaft 11, and are equi-angularly spaced around the shaft 11. Similarly the bores adjacent the opposite end of the rotor assembly 12 are aligned and equi-angularly spaced. Each bore 14 is screw threaded, and receives a radially disposed tubular element or screw 15. The head of each screw 15 is of conventional form, having a transverse slot 16 for receiving a screwdriver. The screw threaded shank of each screw 15 is hollow, being open at the free end of the shank, and being open adjacent the head of the screw by way of a transverse bore 17 in the wall of the shank. Each screw 15 is so positioned with respect to the wall of the shaft 11 that the screw protrudes at 27 into the longitudinal passageway 25 of the shaft 11 beyond the inner wall or surface 26 which bounds the longitudinal passageway. Thus the open free end of each screw 15 will receive oil from within the shaft 11 from a region of the passageway 25 spaced radially inwardly from the wall 26 thereof. It is important that the screws protrude some distance beyond the inner wall of the shaft 11 since any foreign matter entrained by the oil will migrate to the inner surface of the shaft 11 as the shaft 11 rotates, as a result of centrifugal action. Thus if the screws 15 have their open ends adjacent the inner surface of the shaft then they would tend to collect any foreign material which migrates towards the wall of the shaft 11. However, by ensuring that the screws 15 protrude radially inwardly beyond the inner surface of the wall of the shaft 11 the screws will receive clean oil.

Each set of screws 15, that is to say those screws associated with a set of bores 14 at a particular axial location on the shaft 11 serve to secure to the shaft 11 a respective weir assembly 18. Each weir assembly is annular, and encircles the shaft 11. Moreover, each weir assembly includes a pair of annular channels 19, 21 presented to the outer surface of the shaft 11, that is to say the channels 19, 21 have their open faces closed by the outer surface of the shaft 11. The screws 15 extend through the channel 19 of their respective weir assembly the heads of the screws abutting the outer surface of the base of their respective channel 19. The transverse bore 17 of each screw is so positioned that when the screw has its head engaging the outer surface of its base of the respective channel 19, and trapping the weir assembly in position on the shaft 11, then the transverse bore 17 opens into the channel 19, and so places the channel 19 in communication with the interior of the screw 15, and by way of the interior of the shank of the screw 15, in communication with the interior of the shaft 11.

The channels 19, 21 are positioned side-by-side, and include a common wall 20. The common wall 20 is formed with a plurality of apertures 22 spaced around the circumference of the wall 20, and each spaced by the same distance from the base of the channel 19. The channel 21 is deeper than the channel 19, and its wall 23 opposite, and parallel to the wall 20 is cut away so as to extend from the base 24 of the channel 21 only part way towards the shaft 11.

During use of the alternator, oil supplied to the interior of the shaft 11 flows along the interior of the shaft 11, and into each of the hollow screws 15. As stated above, each screw 15 receives oil from a region of the shaft 11 spaced radially inwardly from the inner surface of the shaft 11, and the oil flows along the radially extending screws 15 as a result of centrifugal force. Oil is discharged from the screws 15 by way of the transverse bore 17 into the channel 19 of the respective weir assembly 18, and fills the channel 19 up to the level of the apertures 22. Thereafter, oil spills through the apertures 22 and into the channels 21 filling the channels 21 up to the level of the free edge of the wall 23 of the channel 21. Thereafter, oil overflows the radially innermost edge of the wall 23 of each channel 21 and flies radially outwardly under centrifugal force to impinge upon the overhang 13 of the rotor assembly 12. It will be understood that oil overflows the channel 21 around the whole of its periphery, and so the whole of the overhang 13 receives cooling oil. The cooling oil migrates through the overhang 13, and is thrown from the radially outermost surface of the overhang 13 under centrifugal force to impinge on the stator overhang which is disposed radially outwardly from the rotor overhang 13. Ultimately, the oil collects against the inner surface of the casing of the machine, and since the casing is not rotating then the oil drains to the lowest part of the casing where it is collected, and returned to the interior of the shaft 11 after being filtered, de-aerated, and cooled.

It will be understood that the weir assembly and screws 15 associated with the opposite end overhang of the rotor assembly 12 operate in exactly the same manner to supply cooling oil to the opposite end overhang 13 of the rotor assembly, and the opposite end overhang of the stator assembly.

Where the alternator includes exciter windings separate from the main rotor and stator windings then oil can of course be supplied from the interior of the shaft 11 in a similar manner to cool these additional windings.

It will be understood that should any particles of foreign matter enter a screw 15, and obstruct the flow of oil therethrough then it is a relatively simple matter to remove the offending screw for cleaning, since the screw is merely in screw threaded engagement with the wall of the bore 14 of the shaft 11. Furthermore, should it become necessary to remove the weir assembly then it is merely necessary to remove the associated screws 15 whereupon the weir assembly is freely slidable on the shaft. Moreover, it will be understood that while it is not essential to provide each weir assembly with a plurality of screws 15, it may be advantageous to do so since in the event that one of the screws becomes blocked, for example, by foreign matter, then the other screw will still supply the weir assembly. However, where oil is supplied by one screw 15 only, to the respective weir assembly, no significant loss of efficiency results, since the weir assembly ensures that distribution of oil takes place around the whole circumference of the weir assembly, since under centrifugal force the oil collects in the channels 19, 21 to the same depth around the whole of their circumference. There may of course in such circumstances be a reduction in the volume of cooling oil delivered where one screw becomes blocked, since the remaining screw or screws will be called upon to supply the whole of the requirement of cooling oil.

In a modification the base 24 of the channel 21 is formed with a plurality of slots or other apertures spaced around its circumference so that oil leaves the channel 21 under centrifugal force by way of the apertures rather than overflowing the wall 23.

The diameter of the bore 17 of the or each screw 15 and the diameter of the hollow shank thereof are so chosen in relation to the viscosity of the oil as to afford the optimum flow rate for cooling the windings.

I claim:

1. A dynamo electric machine comprising a hollow rotor shaft having an inner surface which bounds a longitudinal passageway along which cooling oil flows in use, and oil oulet means in the wall of said hollow shaft whereby oil is discharged from said passageway, said outlet means including a tubular element which extends substantially radially through the rotor shaft wall and which protrudes inwardly into said passageway from said inner surface of the shaft so as to receive oil from a region of the passageway spaced inwardly from the inner surface of the shaft, said element discharging oil at the exterior of the shaft into an annular weir member carried by and encircling the shaft and which presents an annular recess to the shaft, oil discharged from said element collecting in use, as a result of centrifugal force in said recess and when said recess is full, overflowing an edge of said recess around the recess periphery so as to be thrown by centrifugal force, onto windings of the machine encircling said shaft and disposed generally radially outwardly from said edge of the recess, said element serving at least in part as the means securing said weir member to said shaft.

2. A machine as claimed in claim 1 whereas said tubular element is a hollow screw threaded member secured to the shaft by being in screw threaded engagement with the wall of a bore in said shaft.

* * * * *